United States Patent
Thomas et al.

(10) Patent No.: US 9,735,951 B2
(45) Date of Patent: *Aug. 15, 2017

(54) SYSTEM AND METHOD FOR REMOTE CLOCK ESTIMATION FOR RELIABLE COMMUNICATIONS

(71) Applicant: Synaptive Medical (Barbados) Inc., Bridgetown (BB)

(72) Inventors: Monroe M. Thomas, Toronto (CA); Simon Alexander, Toronto (CA)

(73) Assignee: Synaptive Medical (Barbados) Inc., Bridgetown (BB)

(*) Notice: Subject to any disclaimer, the term of this patent is extended or adjusted under 35 U.S.C. 154(b) by 0 days.

This patent is subject to a terminal disclaimer.

(21) Appl. No.: 14/972,332

(22) Filed: Dec. 17, 2015

(65) Prior Publication Data

US 2016/0105275 A1  Apr. 14, 2016

Related U.S. Application Data

(63) Continuation of application No. 14/315,595, filed on Jun. 26, 2014, now Pat. No. 9,294,265.

(51) Int. Cl.
*H04J 3/06* (2006.01)
*H04L 7/04* (2006.01)
*H04L 12/26* (2006.01)

(52) U.S. Cl.
CPC .............. *H04L 7/04* (2013.01); *H04J 3/0602* (2013.01); *H04J 3/0667* (2013.01); *H04L 43/106* (2013.01)

(58) Field of Classification Search
CPC ........ H04L 7/04; H04L 43/106; H04J 3/0602; H04J 3/0667
See application file for complete search history.

(56) References Cited

U.S. PATENT DOCUMENTS

| | | | |
|---|---|---|---|
| 6,587,875 B1 | 7/2003 | Ogus | |
| 9,294,265 B2* | 3/2016 | Thomas | ............... H04L 43/106 |
| 2003/0050733 A1* | 3/2003 | Wang | ..................... A61B 34/77 |
| | | | 700/245 |
| 2007/0055144 A1* | 3/2007 | Neustadter | ........... A61N 5/1049 |
| | | | 600/425 |
| 2007/0086489 A1 | 4/2007 | Carlson et al. | |
| 2007/0086490 A1* | 4/2007 | Carlson | ................. H04J 3/0667 |
| | | | 370/516 |
| 2007/0270690 A1* | 11/2007 | Woerlein | ............... A61B 90/36 |
| | | | 600/429 |
| 2009/0080737 A1* | 3/2009 | Battle | ............... A61M 25/0662 |
| | | | 382/131 |
| 2009/0276542 A1 | 11/2009 | Aweya et al. | |
| 2010/0034103 A1 | 2/2010 | Froehlich et al. | |
| 2012/0262695 A1* | 10/2012 | Faul | ........................ G01C 3/08 |
| | | | 356/3.13 |

(Continued)

*Primary Examiner* — Clemence Han
(74) *Attorney, Agent, or Firm* — Marshall & Melhorn, LLC

(57) ABSTRACT

An electronic device is provided including a processor, a communications interface coupled to the processor, a memory coupled to the processor, and a module saved in the memory. The module configures the processor to receive a first communications packet from a remote device via the communications interface including information useful for estimating a clock offset of the remote device, and determine an upper bound of the clock offset of the remote device with respect to the electronic device based on the information.

20 Claims, 5 Drawing Sheets

(56) References Cited

U.S. PATENT DOCUMENTS

| | | | |
|---|---|---|---|
| 2014/0010515 A1* | 1/2014 | Lee | H04L 65/605 386/207 |
| 2014/0064303 A1 | 3/2014 | Aweya et al. | |
| 2014/0078517 A1* | 3/2014 | Ben-Yishai | A61B 8/4254 356/614 |
| 2014/0213193 A1 | 7/2014 | Zhang et al. | |
| 2014/0253388 A1 | 9/2014 | Jalali et al. | |
| 2015/0332465 A1* | 11/2015 | Schmidt | G01S 5/02 348/169 |

* cited by examiner though the following description and drawings are illustrative of the

SYSTEM AND METHOD FOR REMOTE CLOCK ESTIMATION FOR RELIABLE COMMUNICATIONS

CROSS REFERENCE TO RELATED APPLICATIONS

The present application is a continuation of and claims priority to U.S. patent application Ser. No. 14/315,595, filed Jun. 26, 2014, the entirety of which is hereby incorporated by reference.

FIELD

The present disclosure generally relates to estimating the offset of a clock on a remote system, and more specifically, to a system and method for remote clock estimation for reliable communications.

BACKGROUND

Increasingly, tasks are being completed by workers who are located at a site that is remote to the work location. This saves people time and money commuting, increases productivity, and reduces stress therefore offering a host of intangible benefits to society.

In one application, medical professionals may wish to distribute the tracked coordinates of tools and other objects within some field of operation to two or more different systems that will be in use during surgeries. It is important that the distributed track information not be too old when it is used to make critical decisions, where coordinates that are too old could lead to making incorrect decisions or displaying invalid information. Examples include how to position a robotic arm relative to some position of a tool during a surgical procedure and where to display the position of the tool relative to critical structures (such as arteries or tumors) in medical images.

Because the different systems consuming tracked object coordinates are typically connected via an Ethernet network, there are at least two sources of error when determining whether a coordinate is safe to use, including differences in the values of the clocks between the two systems and latency due to network communications.

Conventional approaches for determining network latency and clock offset between two or more systems have considerable shortcomings and are not necessarily suitable for use when computing devices are separated by an Ethernet network, wireless communication protocols and/or the Internet. It would be desirable to have a system and method for determining network latency and clock offset that provides an upper bound on these values and makes it feasible to use Ethernet connections or even Internet connections for mission critical communications where timing is critical.

SUMMARY

One aspect of the present description provides an electronic device including a processor, a communications interface coupled to the processor, a memory coupled to the processor, and a module saved in the memory. The module configures the processor to receive a first communications packet from a remote device via the communications interface including information useful for estimating a clock offset of the remote device, and determine an upper bound of the clock offset of the remote device with respect to the electronic device based on the information.

Another aspect of the present description provides a method of determining an upper bound of a clock offset of a remote device relative to an electronic device, the electronic device including a processor, a communications interface coupled to the processor, a memory coupled to the processor, and a module saved in the memory. The module configures the processor to perform the method comprising receiving a first communications packet from the remote device via the communications interface including information useful for estimating a clock offset of the remote device, and determining the upper bound of the clock offset of the remote device with respect to the electronic device based on the information.

A further understanding of various aspects of the subject matter can be realized by reference to the following detailed description and drawings.

BRIEF DESCRIPTION OF THE DRAWINGS

In order that the subject matter may be readily understood, embodiments are illustrated by way of examples in the accompanying drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The systems and methods described herein may be useful in the field of neurosurgery, including oncological care, neurodegenerative disease, stroke, brain trauma and orthopedic surgery; however persons of skill will appreciate the ability to extend these concepts to other conditions or fields of medicine. It should be noted that the surgical process is applicable to surgical procedures for brain, spine, knee and any other suitable region of the body that will benefit from the use of an access port or small orifice to access the interior of the human body. While the medical field and, specifically, medical procedures and/or surgery are used as examples of applications of the subject matter of the present description, it should be appreciated that the system and method of the present application can be applied to any application where it is important to have an accurate estimate or upper bound on the offset of a clock of a remote system connected to a local system through a network. Additional possible applications include aerospace communications, aviation, telecommunications, data backup and archival systems, geolocation, etc.

Various apparatuses or processes will be described below to provide examples of embodiments of the method and system disclosed herein. No embodiment described below limits any claimed embodiment and any claimed embodiments may cover processes or apparatuses that differ from those described below. The claimed embodiments are not limited to apparatuses or processes having all of the features of any one apparatus or process described below or to features common to multiple or all of the apparatuses or processes described below. It is possible that an apparatus or process described below is not an embodiment of any claimed subject matter.

Furthermore, numerous specific details are set forth in order to provide a thorough understanding of the embodiments described herein. However, it will be understood by those skilled in the relevant arts that the embodiments described herein may be practiced without these specific details. In other instances, well-known methods, procedures and components have not been described in detail so as not to obscure the embodiments described herein.

Figure 1:
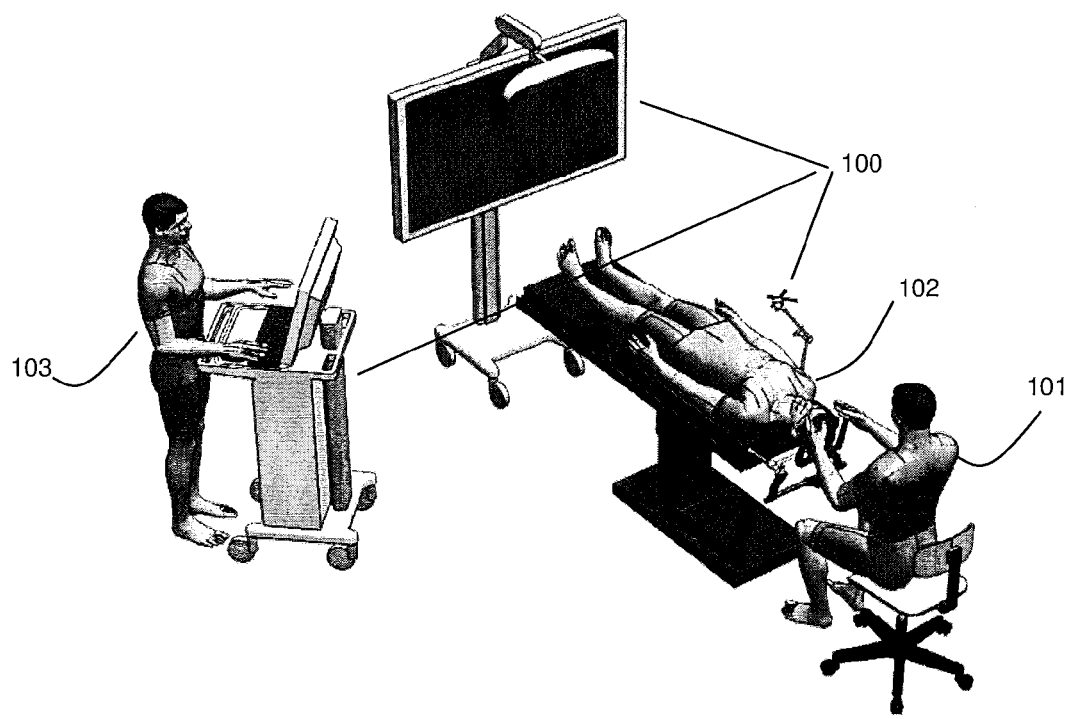
FIG. 1 shows an exemplary operating room setup for a medical procedure that may benefit from aspects of the present disclosure.

Referring to FIG. 1, an exemplary navigation system 100 is shown to support, for example minimally invasive access port-based surgery. In FIG. 1, a neurosurgeon 101 conducts a minimally invasive port-based surgery on a patient 102 in an operating room (OR) environment. The navigation system 100 includes an equipment tower, tracking system, displays and tracked instruments to assist the surgeon 101 during his procedure. An operator 103 is also present to operate, control and provide assistance for the navigation system 100.

A new approach to resection of brain tumors and ICHs is the use of a small port to access the tumor or ICH. The port is typically a hollow tube inserted into the brain for the purpose of minimally-invasive neurosurgery. The port is inserted via a very small burr hole craniotomy into a sulcus of the brain. Because the port follows a sulcus, the port compromises less white matter. Resection of the tumor is conducted via instruments inserted into the port. In such highly delicate surgeries requiring highly specialized medical professionals, some of the professionals that should be assigned to work on certain patients are often located at remote locations. In some cases, the medical professional may only be able to participate in the medical procedure remotely using computer equipment remotely connected. Such remote participation benefits from very reliable network communications where timing differences caused by network latency and clock offset between different systems is well understood and known.

Figure 2:
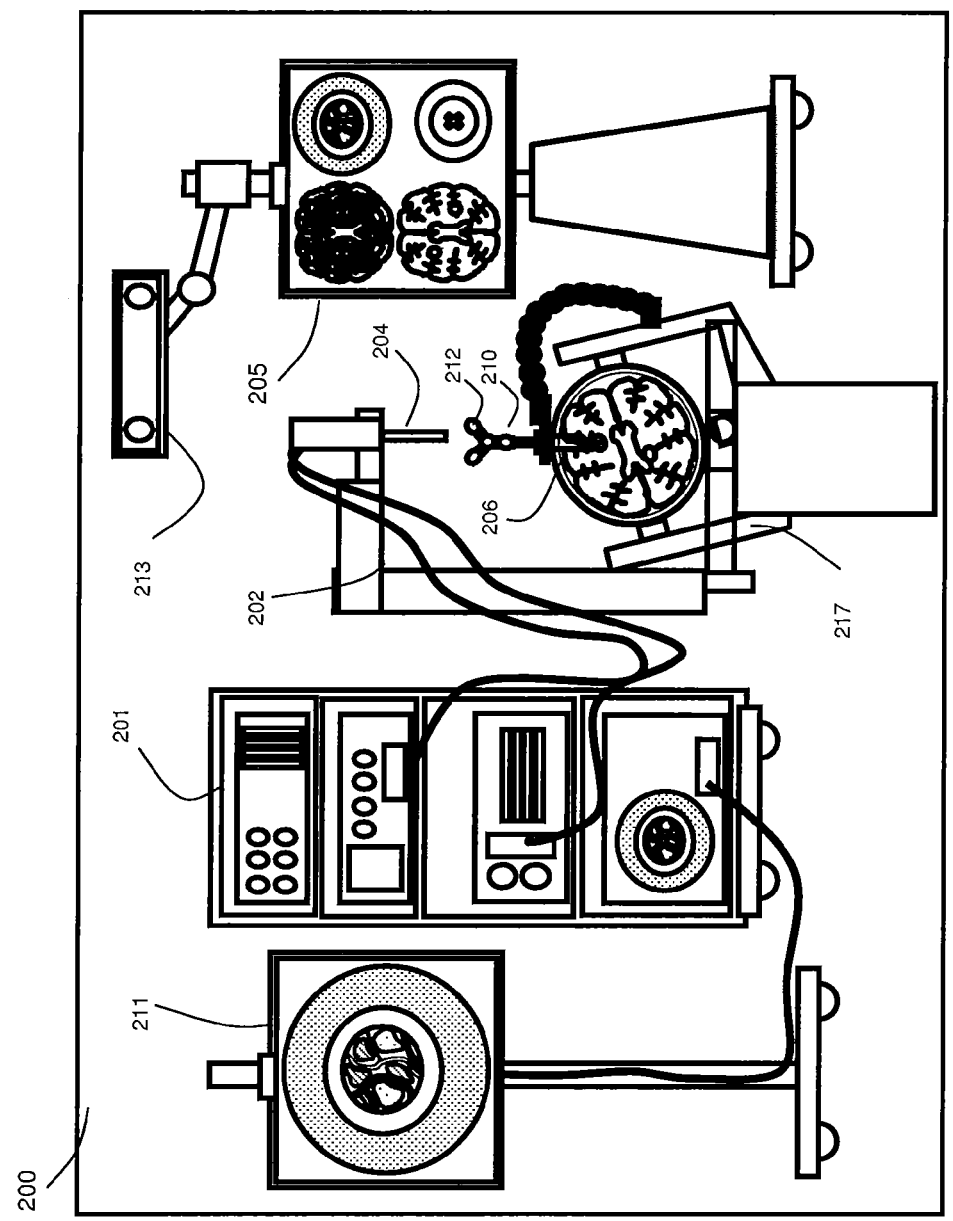
FIG. 2 is a block diagram illustrating components of a medical navigation system that may be used to implement aspects of the present disclosure.

Referring to FIG. 2, a block diagram is shown illustrating components of an exemplary medical navigation system 200. The medical navigation system 200 illustrates the context in which remote participation by a medical professional, such as that described herein, may be implemented. The medical navigation system 200 includes one or more monitors 205, 211 for displaying a video image, an equipment tower 201, and a mechanical arm 202, which supports an optical scope 204. The equipment tower 201 is mounted on a frame (e.g., a rack or cart) and may contain a computer or controller (example provided with reference to FIG. 3), planning software, navigation software, a power supply and software to manage the mechanical arm 202 and tracked instruments. In one example, the equipment tower 201 may be a single tower configuration with dual display monitors 211, 205, however other configurations may also exist (e.g., dual tower, single display, etc.). Furthermore, the equipment tower 201 may also be configured with a universal power supply (UPS) to provide for emergency power, in addition to a regular AC adapter power supply.

A patient's anatomy may be held in place by a holder. For example, in a port-based neurosurgical procedure the patient's head may be held in place by a head holder 217, and an access port 206 and an introducer 210 may be inserted into the patient's head. The introducer 210 may be tracked using a tracking camera 213, which provides position information for the navigation system 200. The tracking camera 213 may also be used to track tools and/or materials used in the surgery, as described in more detail below. In one example, the tracking camera 213 may be a 3D optical tracking stereo camera, similar to one made by Northern Digital Imaging (NDI), configured to locate reflective sphere tracking markers 212 in 3D space. In another example, the tracking camera 213 may be a magnetic camera, such as a field transmitter, where receiver coils are used to locate objects in 3D space, as is also known in the art. In some examples, cameras such as the tracking camera 213 may be used to provide an image to a medical professional located at a remote location. In some examples, any number of cameras needed to accommodate a remotely located medical professional may be suitably used and placed in the medical navigation system 200.

Location data of the mechanical arm 202 and access port 206 may be determined by the tracking camera 213 by detection of tracking markers 212 placed on these tools, for example the introducer 210 and associated pointing tools. Tracking markers may also be placed on surgical tools or materials to be tracked. The secondary display 205 may provide output of the tracking camera 213. In one example, the output may be shown in axial, sagittal and coronal views as part of a multi-view display.

As noted above with reference to FIG. 2, the introducer 210 may include tracking markers 212 for tracking. The tracking markers 212 may be reflective spheres in the case of an optical tracking system or pick-up coils in the case of an electromagnetic tracking system. The tracking markers 212 are detected by the tracking camera 213 and their respective positions are inferred by the tracking software.

In some examples, the exemplary medical navigation system 200 may even have one or more robotic arms (now shown) that are controlled, at least in part, by a medical professional located at a remote location, thus allowing a medical procedure or surgery to be conducted, at least in part, by a medical professional located at a remote location.

Figure 3:
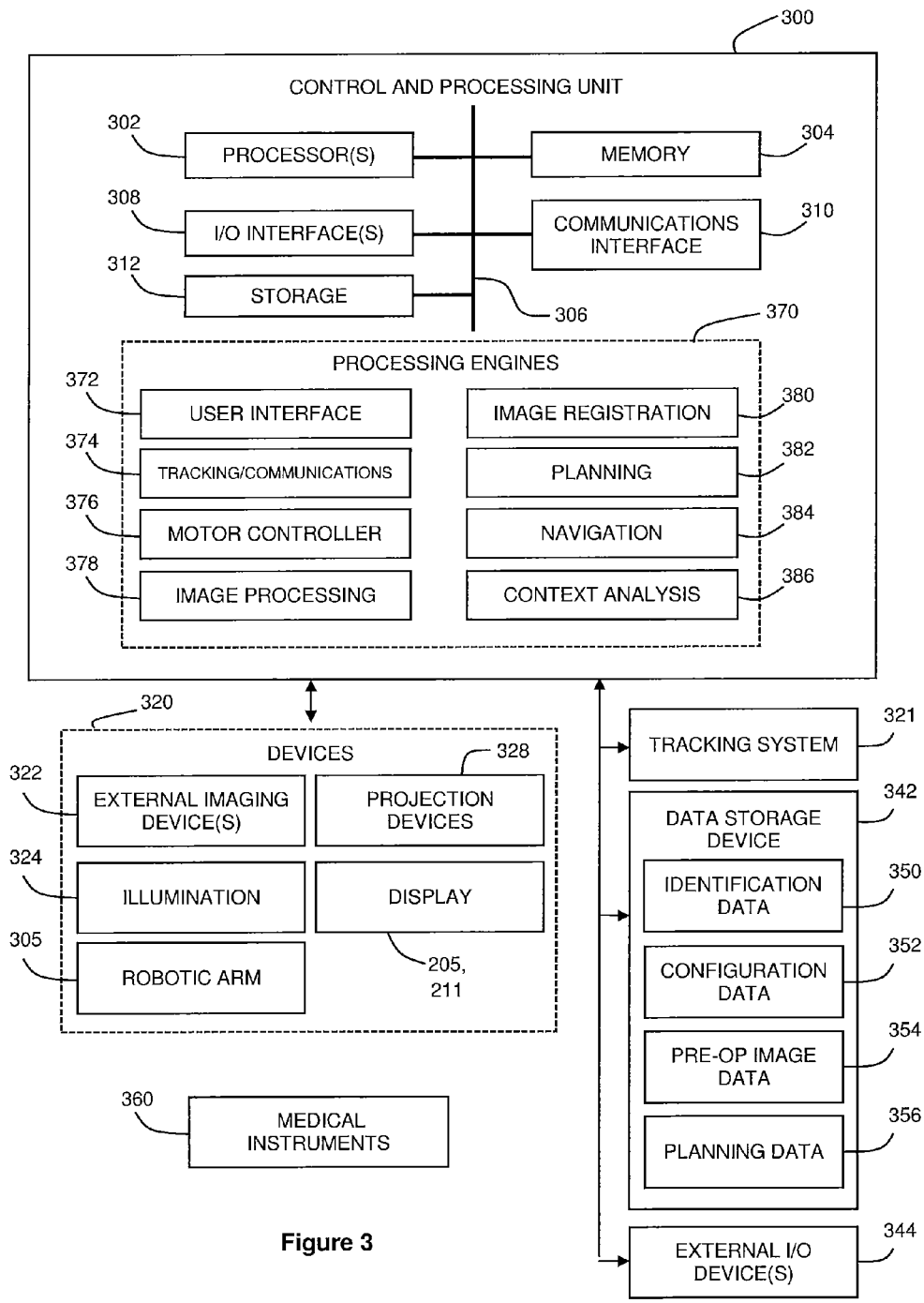
FIG. 3 is a block diagram illustrating a control and processing system that may be used in the navigation system shown in FIG. 2 and may be used to implement aspects of the present disclosure.

Referring to FIG. 3, a block diagram is shown illustrating a control and processing system 300 (also referred to as an electronic device 300) that may be used in the navigation system 200 shown in FIG. 2. In one example, control and processing system 300 may include one or more processors 302, a memory 304, a system bus 306, one or more input/output interfaces 308, a communications interface 310, and storage device 312. Control and processing system 300 may be interfaced with other external devices, such as tracking system 321, data storage 342, and external user input and output devices 344, which may include, for example, one or more of a display, keyboard, mouse, foot pedal, microphone and speaker. Data storage 342 may be any suitable data storage device, such as a local or remote computing device (e.g. a computer, hard drive, digital media device, or server) having a database stored thereon. In the example shown in FIG. 3, data storage device 342 includes identification data 350 for identifying one or more medical instruments 360 and configuration data 352 that associates customized configuration parameters with one or more medical instruments 360. Data storage device 342 may also include preoperative image data 354 and/or medical procedure planning data 356. Although data storage device 342 is shown as a single device in FIG. 3, it will be understood that in other embodiments, data storage device 342 may be provided as multiple storage devices.

In a further embodiment, various 3D volumes, at different resolutions, may each be captured with a unique time-stamp and/or quality metric. This data structure provides an ability to move through contrast, scale and time during the procedure and may also be stored in data storage device 342.

Medical instruments 360 are identifiable by control and processing unit 300. Medical instruments 360 may be connected to and controlled by control and processing unit 300, or medical instruments 360 may be operated or otherwise employed independent of control and processing unit 300. Tracking system 321 may be employed to track one or more of medical instruments and spatially register the one or more tracked medical instruments to an intraoperative reference frame. Tracking system 321 may include the tracking camera 213 shown in FIG. 2.

Control and processing unit 300 may also interface with a number of configurable devices and may intraoperatively reconfigure one or more of such devices based on configuration parameters obtained from configuration data 352. Examples of devices 320, as shown in FIG. 3, include one or more external imaging devices 322, one or more illumination devices 324, the robotic arm 305, one or more projection devices 328, and one or more displays 205, 211.

Exemplary aspects of the disclosure can be implemented via processor(s) 302 and/or memory 304. For example, the functionalities described herein can be partially implemented via hardware logic in processor 302 and partially using the instructions stored in memory 304, as one or more processing modules or engines 370. Example processing modules include, but are not limited to, user interface engine 372, tracking and/or communications module 374, motor controller 376, image processing engine 378, image registration engine 380, procedure planning engine 382, navigation engine 384, and context analysis module 386. While the example processing modules are shown separately in FIG. 3, in one example the processing modules 370 may be stored in the memory 304 and the processing modules may be collectively referred to as processing modules 370.

It is to be understood that the system is not intended to be limited to the components shown in FIG. 3. One or more components of the control and processing system 300 may be provided as an external component or device. In one alternative embodiment, navigation module 384 may be provided as an external navigation system that is integrated with control and processing system 300.

Some embodiments may be implemented using processor 302 without additional instructions stored in memory 304. Some embodiments may be implemented using the instructions stored in memory 304 for execution by one or more general purpose microprocessors. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer readable media used to actually effect the distribution. For examples, there may be at least two control and processing units 300 located at different locations. For example, a first control and processing unit 300 may be located at a location of a medical procedure and a second similar control and processing unit 300 may be located at a remote location where a medical professional will participate in the medical procedure remotely. The first and second control and processing units 300 may communicate through the communications interface 310, where each may be connected to an Ethernet cable or wireless networking technology with various networks and/or the Internet ultimately connecting the first and second control and processing units 300.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which, when executed by a data processing system, causes the system to perform various methods. The executable software and data may be stored in various places including for example ROM, volatile RAM, nonvolatile memory and/or cache. Portions of this software and/or data may be stored in any one of these storage devices.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions may be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

At least some of the methods described herein are capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

Conventional solutions for determining clock offsets (e.g., of a remote system relative to a local system) use a request/response method of network communications to request a new coordinate update. The timestamp of the coordinate data can then be bounded by the time of the request made from the local system and the time the response was received on the local system.

Another conventional solution is to use NTP (Network Time Protocol) to try to synchronize the clocks between two systems. When successful, this method will keep the difference in clocks between different systems small enough that a local system can treat a remote system's timestamps as if they were generated locally.

A problem with the conventional request/response method is that it introduces latency due to network round trips. The proposed method of determining the clock offset of a remote system relative to a local system allows coordinate data to be asynchronously pushed to destination systems from the source system, reducing latency by over half, on average, from the request/response method.

A problem with the conventional NTP approach is that it is often complex and error prone to set up, configure, troubleshoot. Some systems may not support NTP due to this complexity. For example, some robotic arm controllers do not have an NTP implementation. The proposed method of determining the clock offset of a remote system relative to a local system is simpler to implement and configure than an NTP client.

An additional problem with NTP is that it tracks an average offset in the clock from one system to another. For safety purposes, a system such as the medical navigation system 200 that may include remotely located participants in a medical procedure may need to know a worst case upper bound on the possible offset of the system clock of a remote system so that estimates of the age of some coordinate data will present a worst case scenario (i.e., the coordinate may appear older than it actually is but no newer than it actually is). The NTP doesn't expose any of its internal statistics to the rest of the system so there is no way for the rest of the system to derive a worst case bound on the clock offset value. The proposed method of determining the clock offset of a remote system relative to a local system may specifically calculate the worst case upper bound on the remote clock offset and may also transparently provide the statistics used to derive the upper bound.

Further, NTP does not factor in the $\Delta_2-\Delta_0$ term (described below) into the calculation of clock offset. The NTP is based on User Datagram Protocol (UDP), which has minimal queuing effects, and assumes that the latency between systems is symmetric, such that the term $\Delta_2-\Delta_0$ value in the NTP calculation of offset is always zero. However, in some scenarios it is more desirable to use the Transmission Control Protocol (TCP) and/or WebSocket, which do introduce queuing effects, and therefore it cannot be assumed the term $\Delta_2-\Delta_0$ is zero. Therefore, one aspect of the present description introduces $\lambda$ to obtain an upper bound on the value $\Delta_2-\Delta_0$ (described below).

The present application aims to provide a means to accurately estimate the offset of a clock of a remote system relative to the clock on the local system such that coordinate data (e.g., data that may be related to a remote participant using a remote system communicating with the medical navigation system 200) marked with the timestamp of the remote system can be accurately transformed into a timestamp of the local system (e.g., the medical navigation system 200 including the control and processing unit 300) such that the local system can accurately determine the maximum possible age of the coordinate data before deciding to use the coordinate data.

In order to implement the method of the present application, two pairs of timestamps are used, which may occur temporally in order according to some independent observer, defined as follows:

Part One:
T1=timestamp on a local system at the start of transmission of part one of an offset measurement;
T2=timestamp on remote system upon receipt of part one of an offset measurement;
Part Two:
T3=timestamp on remote system indicating the start of transmission of part two of an offset measurement; and
T4=timestamp on local system upon receipt of transmission of part two of an offset measurement.

For the purpose of the example provided herein, the remote system (referred to below as the remote device) may be a remote system communicating with the medical navigation system and the local system may be the medical navigation system 200 including the control and processing unit 300 (referred to below as an electronic device 300).

It may be easy to see how such timestamps T1, T2, T3, and T4 may be ordered in a conventional explicit request/response system to form a measurement. However, the current method does not require an explicit request/response system to form a measurement. Instead, the current system and method may simply add the timestamps T1, T2, and T3 into communications packets including independent messages (e.g., payload data) already being transmitted between the local and remote systems.

Figure 4:
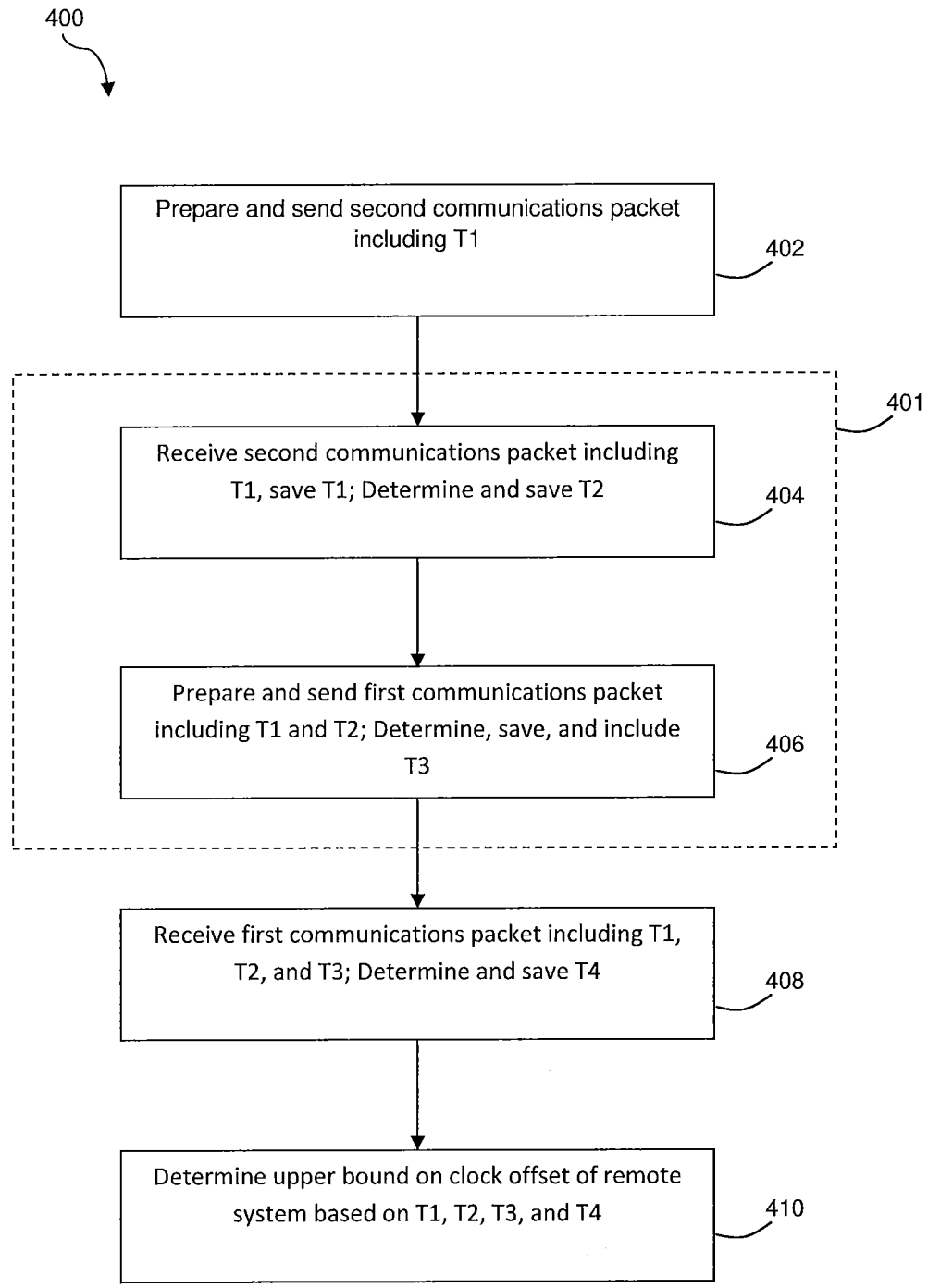
FIG. 4 shows in flow chart form a method of estimating a clock offset of a remote system that may be used by the medical navigation system shown in FIG. 2.

Referring to FIG. 4, a method 400 is shown in flow chart form illustrating a method of estimating a clock offset of a remote system or device that may be used, for example, by the medical navigation system 200 shown in FIG. 2. In one example, the method 400 may be executed by a module such as the module 374 saved in the memory 304, which configures the processor 302 to perform the functions of the method 400 which are executed on the local system, referred to below as the electronic device 300.

At a first block 402, an electronic device 300 (e.g., the local system such as the medical navigation system 200 including an electronic device such as the control and processing unit 300) may prepare and send (e.g., via the communications interface 310) a second communications packet including T1, the timestamp of the electronic device 300 at the start of transmission of the second communications packet.

Next, blocks 404 and 406 may be performed at the remote device, as indicated by reference 401. At block 404, the second communications packet including T1 may be received by the remote device, T1 may be saved, and T2, the timestamp at the remote device (e.g., based on the remote device clock which may include an offset relative to the electronic device 300) upon receipt of the second communications packet may be determined and saved as well.

At block 406, the remote device may prepare and send a first communications packet to the electronic device 300 including T1 and T2. The remote device may also determine T3, the timestamp of the remote device at the start of transmission of first communications packet, which may also be included in the first communications packet, such that the first communications packet includes T1, T2, and T3. T3 may also be based on the remote device clock which may include the offset relative to the electronic device 300.

Next, at a block 408, the electronic device 300 may receive the first communications packet (e.g., via the communications interface 310) including T1, T2, and T3. The electronic device 300 may also determine T4, the timestamp at the electronic device 300 at receipt of the first communications packet. The electronic device may save T1, T2, T3, and T4 for use at the block 410.

While, for the purpose of simplicity in illustration, block 402 is shown to only include T1 in the second communications packet, in one example every message sent in a communications packet may include three of the four needed timestamps (T1, T2, T3) for determining an upper bound on the clock offset of the remote device, as shown at the block 406. Once the electronic device 300 and the remote device have exchanged an initial set of communications packets, the information needed to include T1, T2, and T3 in every communications packet thereafter may be available.

When a message is received at the electronic device 300 (e.g., at the block 408), the following may occur: (1) The current time on the electronic device 300 is saved in a variable called lastMessageArrivalTime; (2) The value T3 from the first communications packet is saved in variable called lastMessageRemoteTime, which may be the timestamp the remote device placed on the first communications packet as the first communications packet was submitted for transmission (e.g., at the block 406); (3) a measurement may be formed, where (a) measurement T1=message T1; (b) measurement T2=message T2; (c) measurement T3=message T3; (d) measurement T4=lastMessageArrivalTime.

When a message is sent from the electronic device 300 (e.g., at the block 402), the following steps may occur in the example where T1, T2, and T3 are all sent: (1) The communications packet is annotated with three timestamp values, where: (a) message T1=lastMessageRemoteTime; (b) message T2=lastMessageArrivalTime; (c) message T3=current time on the electronic device 300.

The method 400 may be symmetric with respect to both the electronic device 300 (e.g., the local system) and remote device (e.g., the remote system), such that whenever the second or subsequent message is received by either the local or remote system, an offset determination can be made on a system relative to the other, and there is no explicit request/response cycle that needs to occur. The first message may not be used to derive a measurement because the values lastMessageArrivalTime and lastMessageRemoteTime may not have been initialized to a valid state, as shown in the simplified example illustrated in FIG. 4.

Next, at a block 410, the electronic device 300 may determine an upper bound on the clock offset of the remote device relative to the electronic device 300 clock. The following equations show an example of how measurements (e.g., T1, T2, T3, and T4) obtained by the method 400 at the blocks 402-408 may be used at the block 410 to calculate an upper bound on the offset of a remote device clock from the electronic device 300 clock. The following values may be defined:

| | |
|---|---|
| $\theta$ | Actual offset of remote device clock relative to electronic device 300 clock |
| $\Delta_0$ | Network delay from electronic device 300 to remote device |
| $\Delta_1$ | Processing delay on remote device |
| $\Delta_2$ | Network delay from remote device to electronic device 300 |
| $\Delta$ | Total delay |
| T1 | As defined above |

Given the values defined above, the following is true:

$$T2 = T1 + \Delta_0 + \theta$$

$$T3 = T2 + \Delta_1$$

$$T4 = T3 + \Delta_2 - \theta$$

$$\Delta = \Delta_0 + \Delta_1 + \Delta_2$$

$$\Delta = T4 - T1$$

$$\Delta_1 = T3 - T2$$

$$\Delta_0 + \Delta_2 = (T4 - T1) - (T3 - T2)$$

and, solving for $\theta$:

$$\theta = \frac{(T2-T1)+(T3-T4)+\Delta_2-\Delta_0}{2} = \frac{(T2-T1)+(T3-T4)}{2} + \frac{\Delta_2-\Delta_0}{2}$$

Because the terms $\Delta_2$ and $\Delta_0$ cannot be calculated directly, a term that provides an upper bound on the value $\Delta_2-\Delta_0$ is sought, such that an upper bound on $\theta$ may be determined. $\lambda$ is introduced, which can be calculated from the values T1, T2, T3, and T4:

$$\lambda = \frac{(\Delta_0+\Delta_2)}{2}$$

$$\lambda = \frac{(T4-T1)-(T3-T2)}{2} = \frac{(T4-T1-T3+T2)}{2}$$

Hence by triangle inequality and positivity of the delta values:

$$|\theta| \le \left|\frac{(T2-T1)+(T3-T4)}{2}\right| + \left|\frac{\Delta_2-\Delta_0}{2}\right| \le \left|\frac{(T2-T1)+(T3-T4)}{2}\right| + \lambda = \theta_u$$

Where we introduce $\theta_u$ as an upper bound on $|\theta|$.

The above inequality can be expressed entirely in terms of T1, T2, T3, T4. Let $\alpha=(T2-T1)+(T3-T4)$:

$$\theta_u = \begin{cases} \frac{T4-T1-T3+T2}{2} + \frac{-T2+T1-T3+T4}{2} = T4-T3 & \alpha < 0 \\ \frac{T4-T1-T3+T2}{2} = T4-T3 = T2-T1 & \alpha = 0 \\ \frac{T4-T1-T3+T2}{2} + \frac{T2-T1+T3-T4}{2} = T2-T1 & \alpha > 0 \end{cases}$$

Thus $\theta_u$ represents the upper bound on the magnitude of the offset of the remote device clock from the electronic device 300 clock.

In another example, the calculation shown above may be refined by adding an additional term to some of the values shown above to represent the maximum likely drift of the two clocks (e.g., of the electronic device 300 and of the remote device) relative to each other. This additional term is called dispersion. The calculations of the dispersion terms are not shown in the present discussion.

Given a timestamp R obtained from the remote device, the corresponding timestamp L on the electronic device 300 may be calculated by:

$$L = R - \theta_u$$

Now that the timestamp L corresponding to the timestamp R of coordinate data received from a remote device, its age may be calculated as follows:

$$\text{Age} = L_{now} - L$$

Where $L_{now}$ is the current time on the electronic device 300.

Some or all of the calculations shown above may be calculated by the electronic device 300 in performing the block 410 of the method 400. Once the upper bound of the clock offset of the remote device is determined, a metric exists for determining the maximum possible age (variable Age, shown above), which provides the electronic device 300 with the upper bound on the possible age of data received from the remote device. In the example of a remote participant using a remote system communicating with the medical navigation system 200, a decision can then be made (either automatically by the remote device or the electronic device 300 or by a user of either system who is presented with the Age value) whether it is still safe to use any commands issued by the remote participant, or whether the remote participant should, for example, be first sent updated information and be given a chance to reconsider any commands that were issued.

Figure 5:
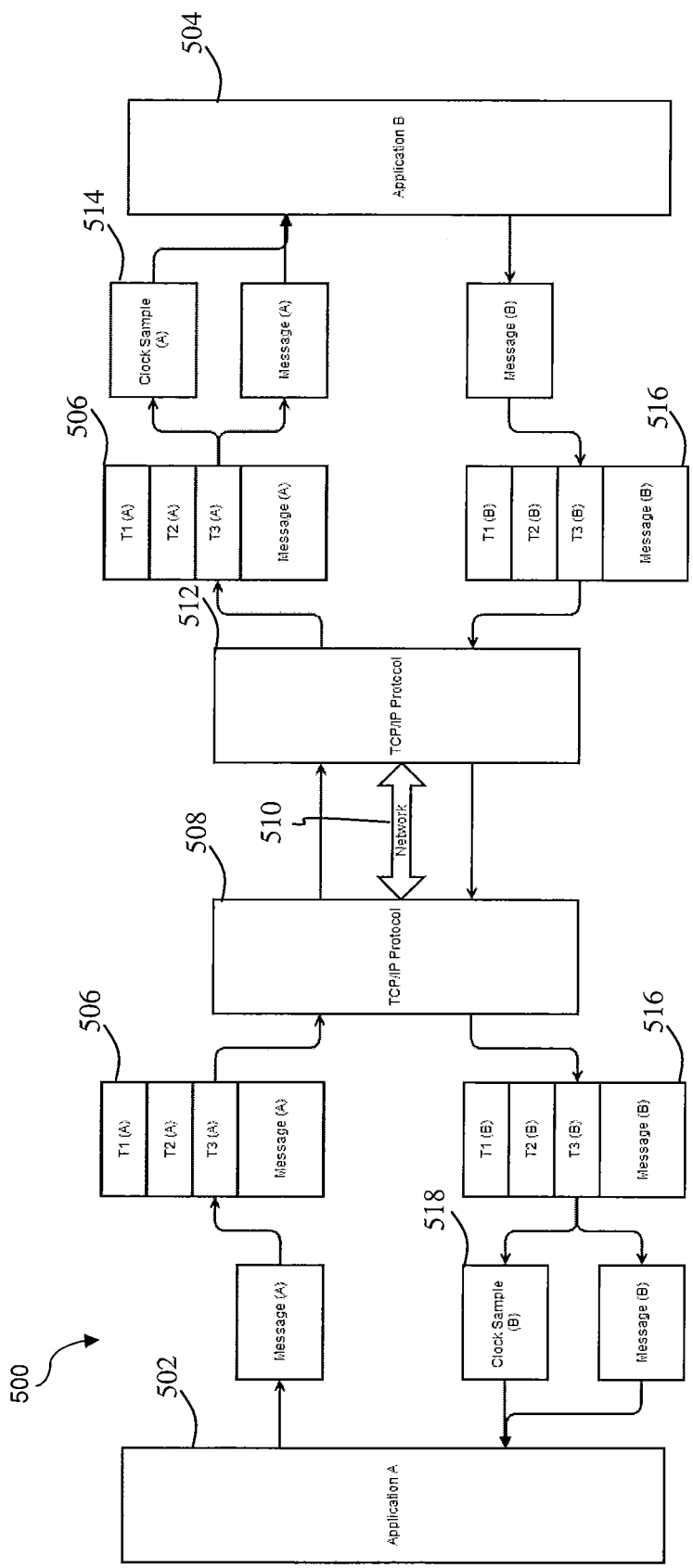
FIG. 5 shows a block diagram illustrating an exemplary message flow through a network where messages are exchanged between a local system and a remote system.

Referring now to FIG. 5, a block diagram 500 is shown illustrating an exemplary message flow through a network where messages are exchanged between a local system (e.g., the electronic device 300) and a remote system (e.g., the remote device). Messages may be exchanged between a first application 502 (e.g., application A such as one of the applications 370 running on electronic device 300, which may be part of medical navigation system 200) and a second application 504 (e.g., running on the remote device). As FIG. 5 is described, reference will be made to the method 400 of FIG. 4.

At the block 402 (FIG. 4), the electronic device 300 prepares and sends the second communications packet including T1, the timestamp of the electronic device 300 at the start of transmission of the second communications packet, as well as T2, and T3, assuming at least one message exchange has occurred between electronic device 300 and the remote device. The second communications packet is shown by reference 506 in FIG. 5, including Message (A) (e.g., the data or payload being sent in the second communications packet), as well as T1, T2, and T3, which are added to the second communications packet by the electronic device 300.

The electronic device 300 running application A 502 may prepare the communications packet and send the communications packet, using for example a TCP/IP protocol, indicated by reference 508, over a network 510. The network 510 may include, for example, an Ethernet connected local area network (LAN) and/or a Wide Area Network (WAN) such as the Internet.

At the block 404 (FIG. 4), the communications packet 506 may be received at the remote device and interpreted using by a TCP/IP protocol, indicated by reference 512. From the communications packet 506, the remote device may extract from message A, T1, T2, and T3, as well as determine and record a timestamp T4 of the remote device by taking a clock sample, indicated by reference 514.

At the block 406 (FIG. 4), the remote device may prepare and send the first communications packet to the electronic device 300 including T1, T2, and T3. It is important to note the relationship between the variables between the second communications packet including message A and the first communications packet including message B, which is as follows:

T1 (second communications packet)=not used in first communications packet;

T2 (second communications packet)=not used in first communications packet;

T3 (second communications packet)=T1 (first communications packet);

T4 (at receipt of second communications packet)=T2 (first communications packet); and T3 (first communications packet)=new value determined by remote device when sending first communications packet.

The remote device determines T3, the timestamp of the remote device indicating the start of transmission of first communications packet, which may also be included in the first communications packet, such that the first communications packet includes T1, T2, and T3, as indicated by reference 516. The first communications packet also includes Message (B) (e.g., the data or payload being sent in the first communications packet).

The remote device running application B 504 may prepare the communications packet and send the communications packet, using for example a TCP/IP protocol, indicated by reference 512, over the network 510.

At the block 408 (FIG. 4), the communications packet 516 may be received at the electronic device 300 and interpreted using a TCP/IP protocol, indicated by reference 508. From the first communications packet 516, the electronic device 300 may extract message B, T1, T2, and T3, as well as determine and record a timestamp T4 of the electronic device 300 by taking a clock sample, indicated by reference 518.

As indicated with reference to FIG. 5, each application A 502 and application B 504 receives a message including T1, T2, T3, and determines T4 upon receipt of the message and may perform the block 410 of method 400 to determine an upper bound on the clock offset of the remote device executing the remote application relative to itself.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

What is claimed is:

1. A medical navigation system for controlling a robotic arm, the medical navigation system comprising:
   a first processor, a first communications interface coupled to the first processor, and a first memory coupled to the first processor, the first memory having a first module saved therein; and
   a robotic arm having a second processor coupled to a second memory, a second communications interface communicating with the first communications interface, and a second module saved in the second memory,
   at least one of the first and second modules configuring the corresponding first or second processor to:
   receive a first communications packet from a remote device via the corresponding communications interface including information useful for estimating a clock offset of the remote device;
   determine an upper bound of the clock offset of the remote device with respect to the processor performing the determination based on the information; and
   determine a maximum age of data contained in the first communications packet based on the upper bound of the clock offset of the remote device with respect to the processor performing the determination.

2. The medical navigation system according to claim 1, wherein the information useful for estimating the clock offset of the remote device includes a timestamp of the processor performing the determination at a start of transmission of a second communications packet to the remote device, T1, a timestamp of the remote device upon receipt of the second communications packet, T2, and a timestamp of the remote device at a start of transmission of the first communications packet, T3.

3. The medical navigation system according to claim 2, wherein the information useful for estimating the clock offset of the remote device further includes a timestamp of the processor performing the determination upon receipt of the first communications packet, T4.

4. The medical navigation system according to claim 2, wherein the second communications packet was sent earlier in time than the first communications packet and the communications packets are TCP/IP packets that are not explicit request/response packets sent for the purpose of determining timing information.

5. The medical navigation system according to claim 2, wherein the first communications packet and the second communications packet are sent over the Internet and the communications interface includes Ethernet.

6. The medical navigation system according to claim 1, wherein when the first processor performs the determination of an upper bound of the clock offset of the remote device and the maximum age of data, the remote device is the robotic arm; or when the second processor performs the determination of an upper bound of the clock offset of the remote device and the maximum age of data, the remote device is the medical navigation system.

7. The medical navigation system according to claim 1, wherein the remote device includes a remote server having a third processor coupled to a third memory and a third communications interface, the third processor running a server module.

8. A method of determining an upper bound of a clock offset of a remote device relative to an electronic device that is part of a medical navigation system, the electronic device including a first processor, a first communications interface coupled to the first processor, a first memory coupled to the first processor, and a first module saved in the first memory, the first module for configuring the first processor to perform the method comprising:
  receiving a first communications packet from the remote device via the first communications interface including information useful for estimating a clock offset of the remote device;
  determining the upper bound of the clock offset of the remote device with respect to the electronic device based on the information; and
  determining a maximum age of data contained in the first communications packet based on the upper bound of the clock offset of the remote device with respect to the electronic device.

9. The method according to claim 8, wherein the electronic device includes at least one of a computing device that is part of the medical navigation system and a robotic arm that is part of the medical navigation system and the remote device includes a remote server having a second processor coupled to a second memory and a second communications interface, the second processor running a server module.

10. The method according to claim 8, wherein the electronic device includes a computing device of the medical navigation system and the remote device includes a robotic arm.

11. The method according to claim 8, wherein the electronic device includes a robotic arm and the remote device includes a computing device of the medical navigation system.

12. The method according to claim 8, wherein the electronic device includes a computing device of the medical navigation system and the remote device includes a server running a server module.

13. The method according to claim 8, wherein the electronic device includes a robotic arm and the remote device includes a server running a server module.

14. The method according to claim 8, wherein the information useful for estimating the clock offset of the remote device includes a timestamp of the electronic device at a start of transmission of a second communications packet to the remote device, T1, a timestamp of the remote device upon receipt of the second communications packet, T2, and timestamp of the remote device at a start of transmission of the first communications packet, T3.

15. The method according to claim 14, wherein the information useful for estimating the clock offset of the remote device further includes a timestamp of the electronic device upon receipt of the first communications packet, T4.

16. The method according to claim 14, wherein the second communications packet was sent earlier in time than the first communications packet and the communications packets are TCP/IP packets that are not explicit request/response packets sent for the purpose of determining timing information.

17. A computer program product comprising a non-transitory computer readable medium having stored thereon computer executable instructions that when executed by an electronic device that is part of a medical navigation system perform a method of determining an upper bound of a clock offset of a remote device relative to the electronic device, the electronic device including a first processor, a first communications interface coupled to the first processor, a first memory coupled to the first processor, and a first module saved in the first memory, the first module for configuring the first processor to perform the method comprising:
  receiving a first communications packet from the remote device via the first communications interface including information useful for estimating a clock offset of the remote device;
  determining the upper bound of the clock offset of the remote device with respect to the electronic device based on the information; and
  determining a maximum age of data contained in the first communications packet based on the upper bound of the clock offset of the remote device with respect to the electronic device.

18. The computer program product according to claim 17, wherein the electronic device includes at least one of a computing device that is part of the medical navigation system and a robotic arm that is part of the medical navigation system and the remote device includes a remote server having a second processor coupled to a second memory and a second communications interface, the second processor running a server module.

19. The computer program product according to claim 17, wherein the electronic device includes a computing device of the medical navigation system and the remote device includes a robotic arm.

20. The computer program product according to claim 17, wherein the electronic device includes a robotic arm and the remote device includes a computing device of the medical navigation system.

* * * * *